United States Patent
Shen et al.

(10) Patent No.: US 12,056,797 B2
(45) Date of Patent: Aug. 6, 2024

(54) SYNTHETIC SCENE GENERATION USING SPLINE REPRESENTATIONS OF ENTITY TRAJECTORIES

(71) Applicant: GM Cruise Holdings LLC, San Francisco, CA (US)

(72) Inventors: Chen Shen, Albany, CA (US); Hariprasad Govardhanam, Fremont, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 108 days.

(21) Appl. No.: 17/556,834

(22) Filed: Dec. 20, 2021

(65) Prior Publication Data

US 2023/0196643 A1   Jun. 22, 2023

(51) Int. Cl.
*G06T 11/20*       (2006.01)
*B60W 60/00*     (2020.01)
*G01C 21/34*     (2006.01)
*G06T 7/20*       (2017.01)

(52) U.S. Cl.
CPC ......... *G06T 11/203* (2013.01); *B60W 60/001* (2020.02); *G01C 21/3453* (2013.01); *G06T 7/20* (2013.01); *B60W 2420/403* (2013.01); *B60W 2420/408* (2024.01); *G06T 2207/30241* (2013.01)

(58) Field of Classification Search
None
See application file for complete search history.

(56) References Cited

U.S. PATENT DOCUMENTS

| | | | |
|---|---|---|---|
| 11,151,880 B1 * | 10/2021 | Shou | G08G 1/0141 |
| 11,308,741 B1 * | 4/2022 | Cardona | G08G 1/0112 |
| 2017/0116854 A1 * | 4/2017 | Sugawara | G08G 1/0129 |
| 2019/0318051 A1 * | 10/2019 | Oswald | G06F 30/20 |
| 2020/0139954 A1 * | 5/2020 | Wallstedt | G06F 16/29 |
| 2020/0310416 A1 * | 10/2020 | Matsunaga | G05D 1/0022 |
| 2022/0180249 A1 * | 6/2022 | Schiegg | G06N 20/00 |

* cited by examiner

*Primary Examiner* — Jeffrey J Chow (57) ABSTRACT

The disclosed technology provides solutions for generating synthetic scenes based on sensor data and in particular, for generating synthetic representations of entities using splines. A process of the disclosed technology can include steps for extracting trajectory data associated with movement of an entity in an environment, generating splines based on the trajectory data, and generating a synthetic scene based on the splines. Systems and machine-readable media are also provided.

17 Claims, 4 Drawing Sheets

SYNTHETIC SCENE GENERATION USING SPLINE REPRESENTATIONS OF ENTITY TRAJECTORIES

BACKGROUND

1. Technical Field

The disclosed technology provides solutions for generating synthetic scenes and in particular, for generating synthetic scenes using spline representations of entity trajectories.

2. Introduction

Autonomous vehicles (AVs) are vehicles having computers and control systems that perform driving and navigation tasks conventionally performed by a human driver. As AV technologies advance, they will be increasingly used to improve transportation efficiency and safety. As such, AVs will need to perform many of the functions conventionally performed by human drivers, such as navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to the understanding of a surrounding environment, such as by tracking the movement of various objects over time.

BRIEF DESCRIPTION OF THE DRAWINGS

Certain features of the subject technology are set forth in the appended claims. However, the accompanying drawings, which are included to provide further understanding, illustrate disclosed aspects, and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

In the course of normal operation, autonomous vehicles (AVs) are sometimes configured to collect and store sensor information corresponding with the environs in which they operate. Depending on the AV configuration, the collected sensor data can include data of various types, including but not limited to: Light Detection and Ranging (LiDAR) data, radar data, sonar data, and/or camera data, and the like. The collected sensor data, when combined with other collected data, such as location/map data, can be combined to form a collection of data (e.g., road data or road bag data) that can be used to reconstruct real-world driving scenarios encountered by the AV. In some aspects, road data can include sensor data corresponding with various agents or entities encountered by the AV. By way of example, agents or entities can include active traffic participants, such as other vehicles, bicycles, and/or driving obstacles, such as road cones or double-parked vehicles, etc.

Road data is sometimes used to re-create or simulate recorded scenarios, for example, on different AV stack versions. However, because the road data includes sensor and map data that is specific to the AV configuration and driving scenarios encountered, the data can contain noise and other artifacts that can make it difficult to use for the generation of synthetic environments and scenarios.

Aspects of the disclosed technology provide solutions for converting road data (or bag data) that includes raw sensor data into a synthetic format, for example, that can be used to create synthetic scenarios. In some aspects, the road data can include sensor data that represents the actions of various entities in an environment. By way of example, the sensor data can include representations of the motions (trajectories) of various entities in a given scene or location.

In some approaches, trajectory information for a given entity can be extracted from the bag data and processed to produce spline representations of the entity motion. As such, splines provide a compressed representation of complex trajectories and can be used to accurately adapt encountered real-world scenarios (represented by raw sensor data) into synthetic descriptions of entity behavior, for example, that can be used in the creation of synthetic/virtual scenarios.

Although the instant disclosure encompasses the use of splines to represent entity motion through an environment, it is understood that simulated three-dimensional (3D) environments can be generated using various other processing steps, and data from various other sources. The generation of simulated environments is discussed in detail in U.S. patent application Ser. No. 17/125,558, entitled, "PROCEDURALLY GENERATED THREE-DIMENSIONAL ENVIRONMENT FOR USE IN AUTONOMOUS VEHICLE SIMULATIONS," which is hereby incorporated by reference in its entirety.

Figure 1:
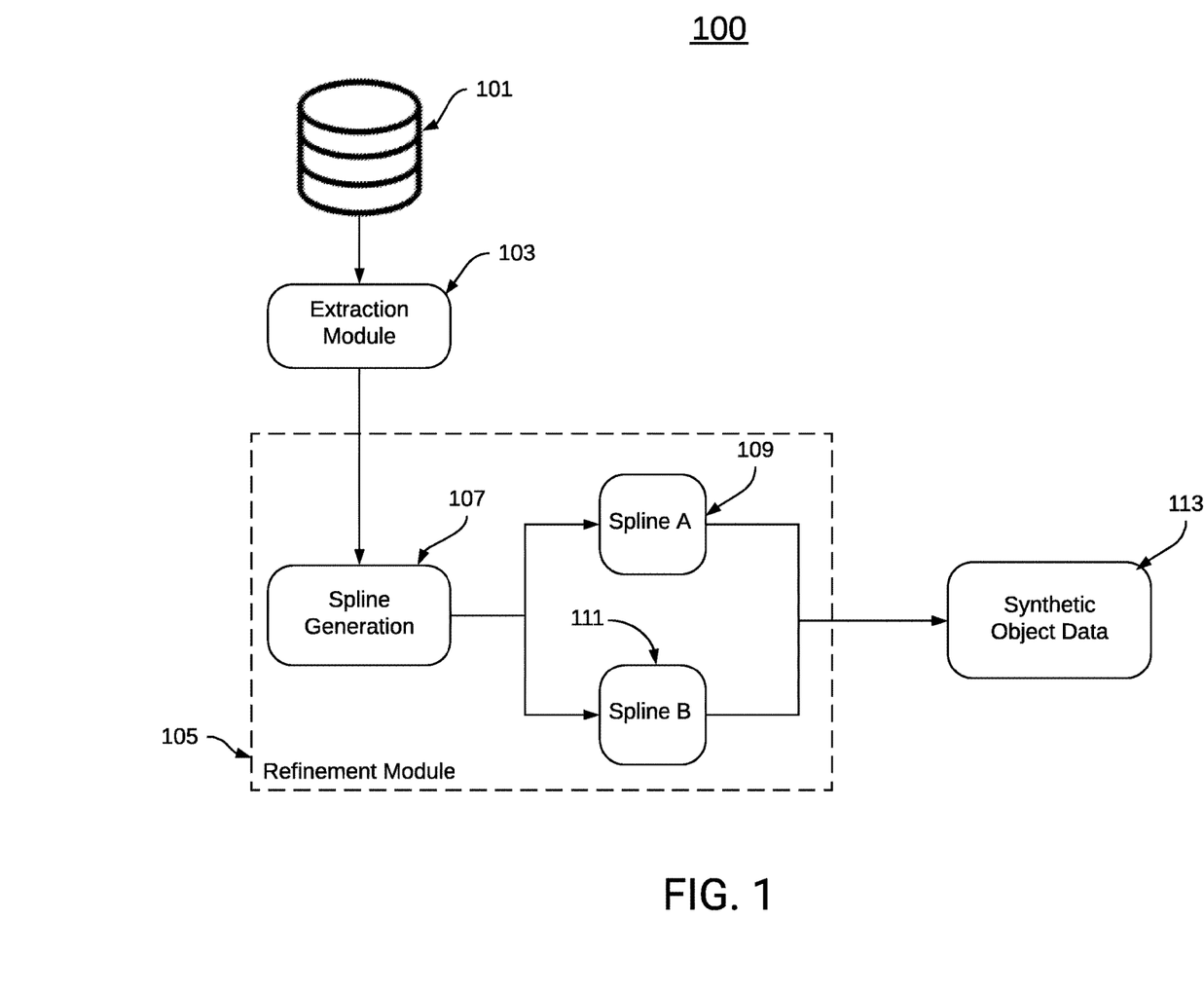
FIG. 1 conceptually illustrates an example system that can be used to generate a synthetic scene, according to some aspects of the disclosed technology.

FIG. 1 conceptually illustrates an example system 100 that can be used to generate a synthetic scene. System 100 includes a store of bag data (database 100) that includes sensor data representing various entities in a given environment. In some implementations, the sensor data can be acquired via one or more environmental sensors, such as those used by an AV during in the course of normal navigation and planning operations.

Sensor data representing the behavior (motion) of one or more entities can be extracted from database 101 via extraction module 103, and provided to refinement module 105 before being converted into a synthetic data format, e.g., a YAML file format. As illustrated in the example of FIG. 1, the extracted trajectory data can be processed to generate splines (block 107) representing the motion of the associated object. In some approaches, multiple splines can be generated to represent a single object trajectory. For example, Spline A (or a first spline) can be used to represent characteristics of the object orientation at different locations along the trajectory. These representations can include three-dimensional coordinates, such as (x, y, z) position coordinates, and/or quaternion coordinates, such as x, y, z, and w coordinates for the object at any given point along the object trajectory. From these positional coordinates, a heading or pose of the object can be determined, for example, based on a derivative of the coordinate information.

Additionally, a second spline (Spline B) 111 can be generated that includes distance and timestamp information describing the object displacement along the geometric space defined by the first spline (Spline A) 109. Together, first spline 109, and second spline 111 include a compressed (and complete) representation of the motion/trajectory of an object through the environment represented in the extracted sensor data. Using first spline 109, and second spline 111, a synthetic representation of entity behavior can be reproduced without retaining the original raw sensor data (block 113).

Figure 2:
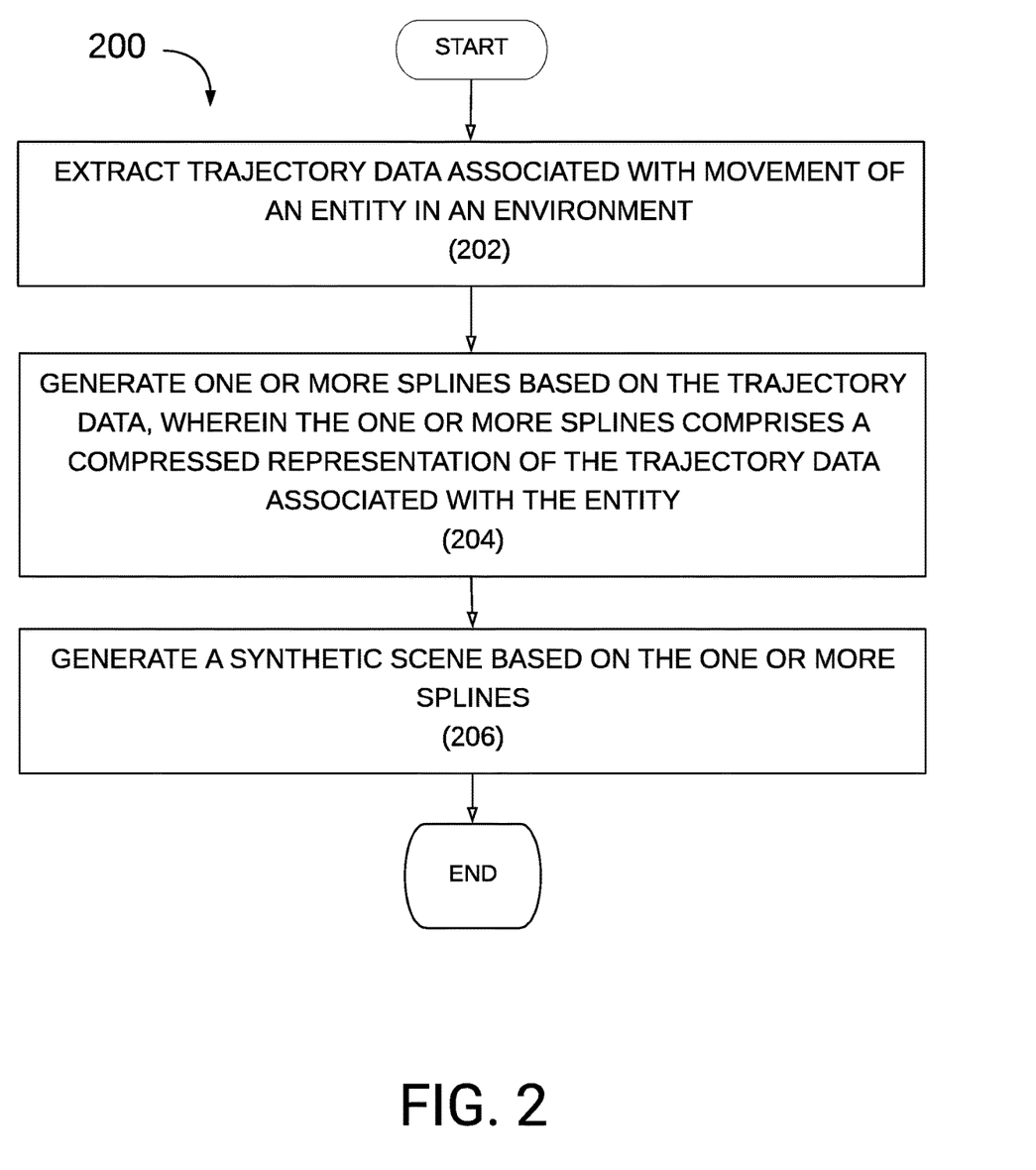
FIG. 2 illustrates a block diagram of an example process for generating a synthetic scene, according to some aspects of the disclosed technology.

FIG. 2 illustrates a block diagram of an example process 200 for generating a synthetic scene. At step 202, process 200 includes extracting trajectory data associated with the movement of an entity in an environment. As discussed above, the trajectory data can be (or can include) sensor data that corresponds with a motion of the observed object/entity through the environment. Such sensor data can include, but is not limited to one or more of: LiDAR data, radar data, camera data, thermal camera data, and/or accelerometer data, etc.

At step 204, process 200 includes generating one or more splines based on the trajectory data. The splines can be used to provide a compressed representation of potentially complex entity trajectories. As discussed above with respect to FIG. 1, geometric representations of the object motion may be represented in one spline (e.g., a first spline), whereas temporal and displacement characteristics of object motion may be represented in a different spline (e.g., a second spline). Although the foregoing examples note that three-dimensional and/or quaternion coordinate systems can be used to represent the object location and/or pose, it is understood that other coordinate representations may be used, without departing from the scope of the disclosed technology.

At step 206, process 200 can include generating a synthetic scene based on splines (e.g., the first spline and the second spline). By using spline representations of object motion, noise can be eliminated from sensor data, and object trajectories can be recreated in synthetic (virtual) environments with greater fidelity.

Figure 3:
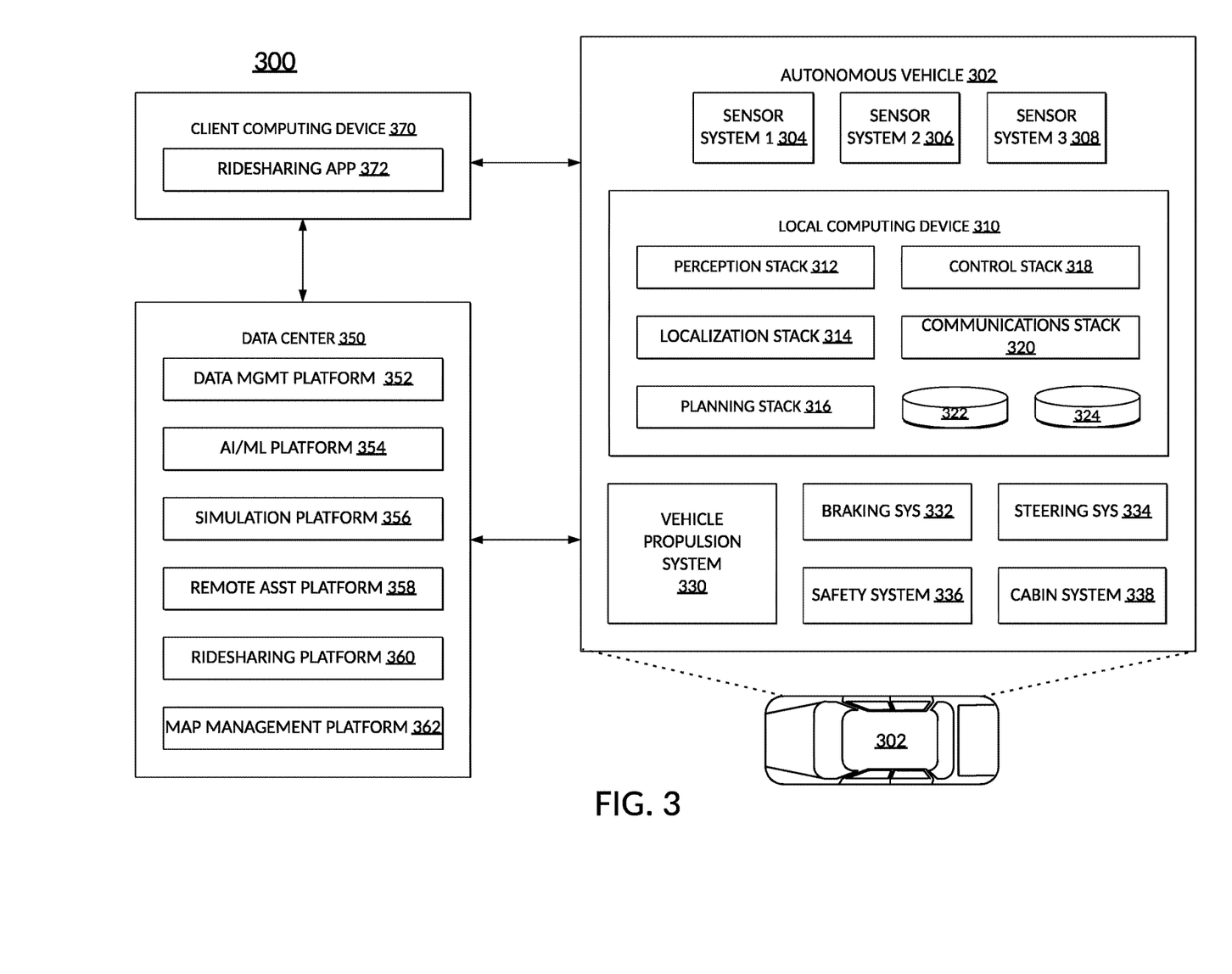
FIG. 3 illustrates an example system environment that can be used to facilitate AV dispatch and operations, according to some aspects of the disclosed technology.

Turning now to FIG. 3, which illustrates an example of an AV management system 300. One of ordinary skill in the art will understand that, for the AV management system 300 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art can appreciate that such variations do not depart from the scope of the present disclosure.

In this example, the AV management system 300 includes an AV 302, a data center 350, and a client computing device 370. The AV 302, the data center 350, and the client computing device 370 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 302 can navigate about roadways without a human driver based on sensor signals generated by multiple sensor systems 304, 306, and 308. The sensor systems 304-308 can include different types of sensors and can be arranged about the AV 302. For instance, the sensor systems 304-308 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 304 can be a camera system, the sensor system 306 can be a LIDAR system, and the sensor system 308 can be a RADAR system. Other embodiments may include any other number and type of sensors.

AV 302 can also include several mechanical systems that can be used to maneuver or operate AV 302. For instance, the mechanical systems can include vehicle propulsion system 330, braking system 332, steering system 334, safety system 336, and cabin system 338, among other systems. Vehicle propulsion system 330 can include an electric motor, an internal combustion engine, or both. The braking system 332 can include an engine brake, brake pads, actuators, and/or any other suitable componentry configured to assist in decelerating AV 302. The steering system 334 can include suitable componentry configured to control the direction of movement of the AV 302 during navigation. Safety system 336 can include lights and signal indicators, a parking brake, airbags, and so forth. The cabin system 338 can include cabin temperature control systems, in-cabin entertainment systems, and so forth. In some embodiments, the AV 302 may not include human driver actuators (e.g., steering wheel, handbrake, foot brake pedal, foot accelerator pedal, turn signal lever, window wipers, etc.) for controlling the AV 302. Instead, the cabin system 338 can include one or more client interfaces (e.g., Graphical User Interfaces (GUIs), Voice User Interfaces (VUIs), etc.) for controlling certain aspects of the mechanical systems 330-338.

AV 302 can additionally include a local computing device 310 that is in communication with the sensor systems 304-308, the mechanical systems 330-338, the data center 350, and the client computing device 370, among other systems. The local computing device 310 can include one or more processors and memory, including instructions that can be executed by the one or more processors. The instructions can make up one or more software stacks or components responsible for controlling the AV 302; communicating with the data center 350, the client computing device 370, and other systems; receiving inputs from riders, passengers, and other entities within the AV's environment; logging metrics collected by the sensor systems 304-308; and so forth. In this example, the local computing device 310 includes a perception stack 312, a mapping and localization stack 314, a planning stack 316, a control stack 318, a communications stack 320, an HD geospatial database 322, and an AV operational database 324, among other stacks and systems.

Perception stack 312 can enable the AV 302 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 304-308, the mapping and localization stack 314, the HD geospatial database 322, other components of the AV, and other data sources (e.g., the data center 350, the client computing device 370, third-party data sources, etc.). The perception stack 312 can detect and classify objects and determine their current and predicted locations, speeds, directions, and the like. In addition, the perception stack 312 can determine the free space around the AV 302 (e.g., to maintain a safe distance from other objects, change lanes, park the AV, etc.). The perception stack 312 can also identify environmental uncertainties, such as where to look for moving objects, flag areas that may be obscured or blocked from view, and so forth.

Mapping and localization stack 314 can determine the AV's position and orientation (pose) using different methods from multiple systems (e.g., GPS, IMUs, cameras, LIDAR, RADAR, ultrasonic sensors, the HD geospatial database 322, etc.). For example, in some embodiments, the AV 302 can compare sensor data captured in real-time by the sensor systems 304-308 to data in the HD geospatial database 322 to determine its precise (e.g., accurate to the order of a few centimeters or less) position and orientation. The AV 302 can focus its search based on sensor data from one or more first sensor systems (e.g., GPS) by matching sensor data from one or more second sensor systems (e.g., LIDAR). If the mapping and localization information from one system is unavailable, the AV 302 can use mapping and localization information from a redundant system and/or from remote data sources.

The planning stack 316 can determine how to maneuver or operate the AV 302 safely and efficiently in its environment. For example, the planning stack 316 can receive the location, speed, and direction of the AV 302, geospatial data, data regarding objects sharing the road with the AV 302 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 302 from one point to another. The planning stack 316 can determine multiple sets of one or more mechanical operations that the AV 302 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 316 can select from multiple backup plans to carry out. For example, while preparing to change lanes to turn right at an intersection, another vehicle may aggressively cut into the destination lane, making the lane change unsafe. The planning stack 316 could have already determined an alternative plan for such an event, and upon its occurrence, help to direct the AV 302 to go around the block instead of blocking a current lane while waiting for an opening to change lanes.

The control stack 318 can manage the operation of the vehicle propulsion system 330, the braking system 332, the steering system 334, the safety system 336, and the cabin system 338. The control stack 318 can receive sensor signals from the sensor systems 304-308 as well as communicate with other stacks or components of the local computing device 310 or a remote system (e.g., the data center 350) to effectuate operation of the AV 302. For example, the control stack 318 can implement the final path or actions from the multiple paths or actions provided by the planning stack 316. This can involve turning the routes and decisions from the planning stack 316 into commands for the actuators that control the AV's steering, throttle, brake, and drive unit.

The communication stack 320 can transmit and receive signals between the various stacks and other components of the AV 302 and between the AV 302, the data center 350, the client computing device 370, and other remote systems. The communication stack 320 can enable the local computing device 310 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 320 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 322 can store HD maps and related data of the streets upon which the AV 302 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 324 can store raw AV data generated by the sensor systems 304-308 and other components of the AV 302 and/or data received by the AV 302 from remote systems (e.g., the data center 350, the client computing device 370, etc.). In some embodiments, the raw AV data can include HD LIDAR point cloud data, image data, RADAR data, GPS data, and other sensor data that the data center 350 can use for creating or updating AV geospatial data.

The data center 350 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 350 can include one or more computing devices remote to the local computing device 310 for managing a fleet of AVs and AV-related services. For example, in addition to managing the AV 302, the data center 350 may also support a ridesharing service, a delivery service, a remote/roadside assistance service, street services (e.g., street mapping, street patrol, street cleaning, street metering, parking reservation, etc.), and the like.

The data center 350 can send and receive various signals to and from the AV 302 and client computing device 370. These signals can include sensor data captured by the sensor systems 304-308, roadside assistance requests, software updates, ridesharing pick-up and drop-off instructions, and so forth. In this example, the data center 350 includes a data management platform 352, an Artificial Intelligence/Machine Learning (AI/ML) platform 354, a simulation platform 356, a remote assistance platform 358, a ridesharing platform 360, and map management system platform 362, among other systems.

Data management platform 352 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 350 can access data stored by the data management platform 352 to provide their respective services.

The AI/ML platform 354 can provide the infrastructure for training and evaluating machine learning algorithms for operating the AV 302, the simulation platform 356, the remote assistance platform 358, the ridesharing platform 360, the map management system platform 362, and other platforms and systems. Using the AI/ML platform 354, data scientists can prepare data sets from the data management platform 352; select, design, and train machine learning models; evaluate, refine, and deploy the models; maintain, monitor, and retrain the models; and so on.

The simulation platform 356 can enable testing and validation of the algorithms, machine learning models, neural networks, and other development efforts for the AV 302, the remote assistance platform 358, the ridesharing platform 360, the map management system platform 362, and other platforms and systems. The simulation platform 356 can replicate a variety of driving environments and/or reproduce real-world scenarios from data captured by the AV 302, including rendering geospatial information and road infrastructure (e.g., streets, lanes, crosswalks, traffic lights, stop signs, etc.) obtained from the map management system platform 362; modeling the behavior of other vehicles, bicycles, pedestrians, and other dynamic elements; simulating inclement weather conditions, different traffic scenarios; and so on.

The remote assistance platform 358 can generate and transmit instructions regarding the operation of the AV 302. For example, in response to an output of the AI/ML platform 354 or other system of the data center 350, the remote assistance platform 358 can prepare instructions for one or more stacks or other components of the AV 302.

The ridesharing platform 360 can interact with a customer of a ridesharing service via a ridesharing application 372 executing on the client computing device 370. The client computing device 370 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 372. The client computing device 370 can be a customer's mobile computing device or a computing device integrated with the AV 302 (e.g., the local computing device 310). The ridesharing platform 360 can receive requests to be picked up or dropped off from the ridesharing application 372 and dispatch the AV 302 for the trip.

Map management system platform 362 can provide a set of tools for the manipulation and management of geographic and spatial (geospatial) and related attribute data. The data management platform 352 can receive LIDAR point cloud data, image data (e.g., still image, video, etc.), RADAR data, GPS data, and other sensor data (e.g., raw data) from one or more AVs 302, UAVs, satellites, third-party mapping services, and other sources of geospatially referenced data. The raw data can be processed, and map management system platform 362 can render base representations (e.g., tiles (2D), bounding volumes (3D), etc.) of the AV geospatial data to enable users to view, query, label, edit, and otherwise interact with the data. Map management system platform 362 can manage workflows and tasks for operating on the AV geospatial data. Map management system platform 362 can control access to the AV geospatial data, including granting or limiting access to the AV geospatial data based on user-based, role-based, group-based, task-based, and other attribute-based access control mechanisms. Map management system platform 362 can provide version control for the AV geospatial data, such as to track specific changes that (human or machine) map editors have made to the data and to revert changes when necessary. Map management system platform 362 can administer release management of the AV geospatial data, including distributing suitable iterations of the data to different users, computing devices, AVs, and other consumers of HD maps. Map management system platform 362 can provide analytics regarding the AV geospatial data and related data, such as to generate insights relating to the throughput and quality of mapping tasks.

In some embodiments, the map viewing services of map management system platform 362 can be modularized and deployed as part of one or more of the platforms and systems of the data center 350. For example, the AI/ML platform 354 may incorporate the map viewing services for visualizing the effectiveness of various object detection or object classification models, the simulation platform 356 may incorporate the map viewing services for recreating and visualizing certain driving scenarios, the remote assistance platform 358 may incorporate the map viewing services for replaying traffic incidents to facilitate and coordinate aid, the ridesharing platform 360 may incorporate the map viewing services into the client application 372 to enable passengers to view the AV 302 in transit en route to a pick-up or drop-off location, and so on.

Figure 4:
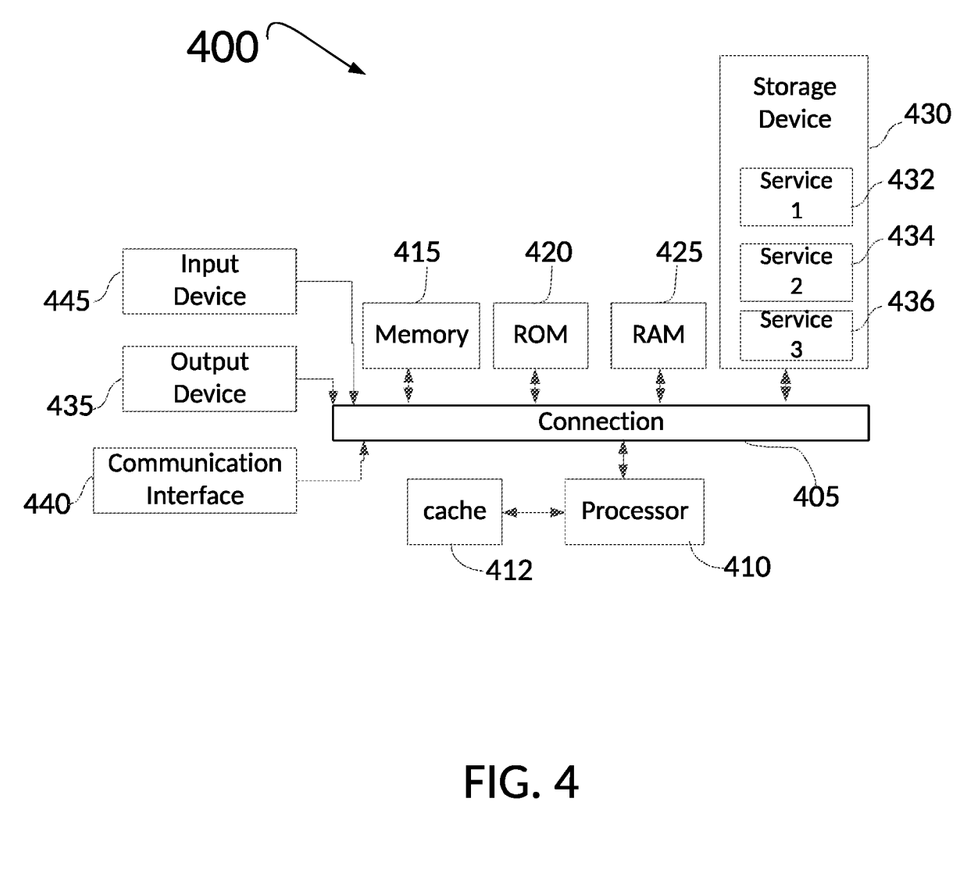
FIG. 4 illustrates an example processor-based system with which some aspects of the subject technology can be implemented.

FIG. 4 illustrates an example processor-based system with which some aspects of the subject technology can be implemented. For example, processor-based system 400 can be any computing device making up internal computing system 410, remote computing system 450, a passenger device executing the rideshare app 470, internal computing device 430, or any component thereof in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments, computing system 400 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read-only memory (ROM) 420 and random-access memory (RAM) 425 to processor 410. Computing system 400 can include a cache of high-speed memory 412 connected directly with, in close proximity to, or integrated as part of processor 410.

Processor 410 can include any general-purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 440 may also include one or more Global Navigation Satellite System (GNSS) receivers or transceivers that are used to determine a location of the computing system 400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

Storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An apparatus for generating a synthetic scene, comprising:
   at least one memory; and
   at least one processor coupled to the at least one memory, the at least one processor configured to:
   obtain bag data of an autonomous vehicle (AV), the bag data including sensor data generated by one or more sensors of an AV during a first time interval;
   extract, from the bag data, trajectory data associated with movement of an entity in an environment associated with the AV;
   generate at least a first spline and a second spline based on the trajectory data, wherein the first spline and the second spline each are a compressed representation of the trajectory data associated with the entity and each of the first spline and the second spline includes a compressed dataset associated with a particular motion characteristic of the movement of the entity during the first time interval; and
   generate a synthetic scene based at least on the first spline and second spline.

2. The apparatus of claim 1, wherein the first spline comprises position coordinate information corresponding with the movement of the entity in the environment.

3. The apparatus of claim 1, wherein the second spline comprises distance information and time information associated with movement of the entity in the environment.

4. The apparatus of claim 1, wherein the sensor data comprises: Light Detection and Ranging (LiDAR) data, radar data, camera data, or a combination thereof.

5. The apparatus of claim 1, wherein the at least one processor is further configured to:
   simulate the movement of the entity in the synthetic scene based at least on the first spline and second spline.

6. The apparatus of claim 1, wherein the first spline characterizes an orientation of the entity at different locations along a trajectory of the entity characterized by the trajectory data.

7. The apparatus of claim 1, wherein the second spline characterizes a displacement of the entity along a geometric space defined by the first spline.

8. A computer-implemented method for generating a synthetic scene, comprising:
   obtaining bag data of an autonomous vehicle (AV), the bag data including sensor data generated by one or more sensors of an AV during a first time interval;
   extracting, from the bag data, trajectory data associated with movement of an entity in an environment associated with the AV;
   generating at least a first spline and a second spline based on the trajectory data, wherein the first spline and a second spline each are a compressed representation of the trajectory data associated with the entity and each of the first spline and the second spline includes a compressed dataset associated with a particular motion characteristic of the movement of the entity during the first time interval; and
   generating a synthetic scene based at least on the first spline and second spline.

9. The computer-implemented method of claim 8, wherein the first spline comprises position coordinate information corresponding with the movement of the entity in the environment.

10. The computer-implemented method of claim 8, wherein the second spline comprises distance information and time information associated with movement of the entity in the environment.

11. The computer-implemented method of claim 8, wherein the sensor data comprises: Light Detection and Ranging (LiDAR) data, radar data, camera data, or a combination thereof.

12. The computer-implemented method of claim 8, further comprising:
   simulating the movement of the entity in the synthetic scene based at least on the first spline and second spline.

13. A non-transitory computer-readable storage medium comprising at least one instruction for causing a computer or processor to:
   obtain bag data of an autonomous vehicle (AV), the bag data including sensor data generated by one or more sensors of an AV during a first time interval;
   extract, from the bag data, trajectory data associated with movement of an entity in an environment associated with the AV;
   generate at least a first spline and a second spline based on the trajectory data, wherein the first spline and the second spline each are a compressed representation of the trajectory data associated with the entity and each of the first spline and the second spline includes a compressed dataset associated with a particular motion characteristic of the movement of the entity during the first time interval; and
   generate a synthetic scene based at least on the first spline and second spline.

14. The non-transitory computer-readable storage medium of claim 13, wherein the first spline comprises position coordinate information corresponding with the movement of the entity in the environment.

15. The non-transitory computer-readable storage medium of claim 13, wherein the second spline comprises distance information and time information associated with movement of the entity in the environment.

16. The non-transitory computer-readable storage medium of claim 13, wherein the sensor data comprises: Light Detection and Ranging (LiDAR) data, radar data, camera data, or a combination thereof.

17. The non-transitory computer-readable storage medium of claim 13, the at least one instruction is further configured to cause the computer or processor to:
   simulate the movement of the entity in the synthetic scene based at least on the first spline and the second spline.

* * * * *